Aug. 11, 1931.  F. E. BEACH ET AL  1,818,668
THEFT PREVENTING DEVICE
Filed Aug. 9, 1928   2 Sheets-Sheet 1

Inventor:
Frederick E. Beach
Edgar G. Petersen
By Williams, Bradbury, McCaleb & Hinkle
Attys.

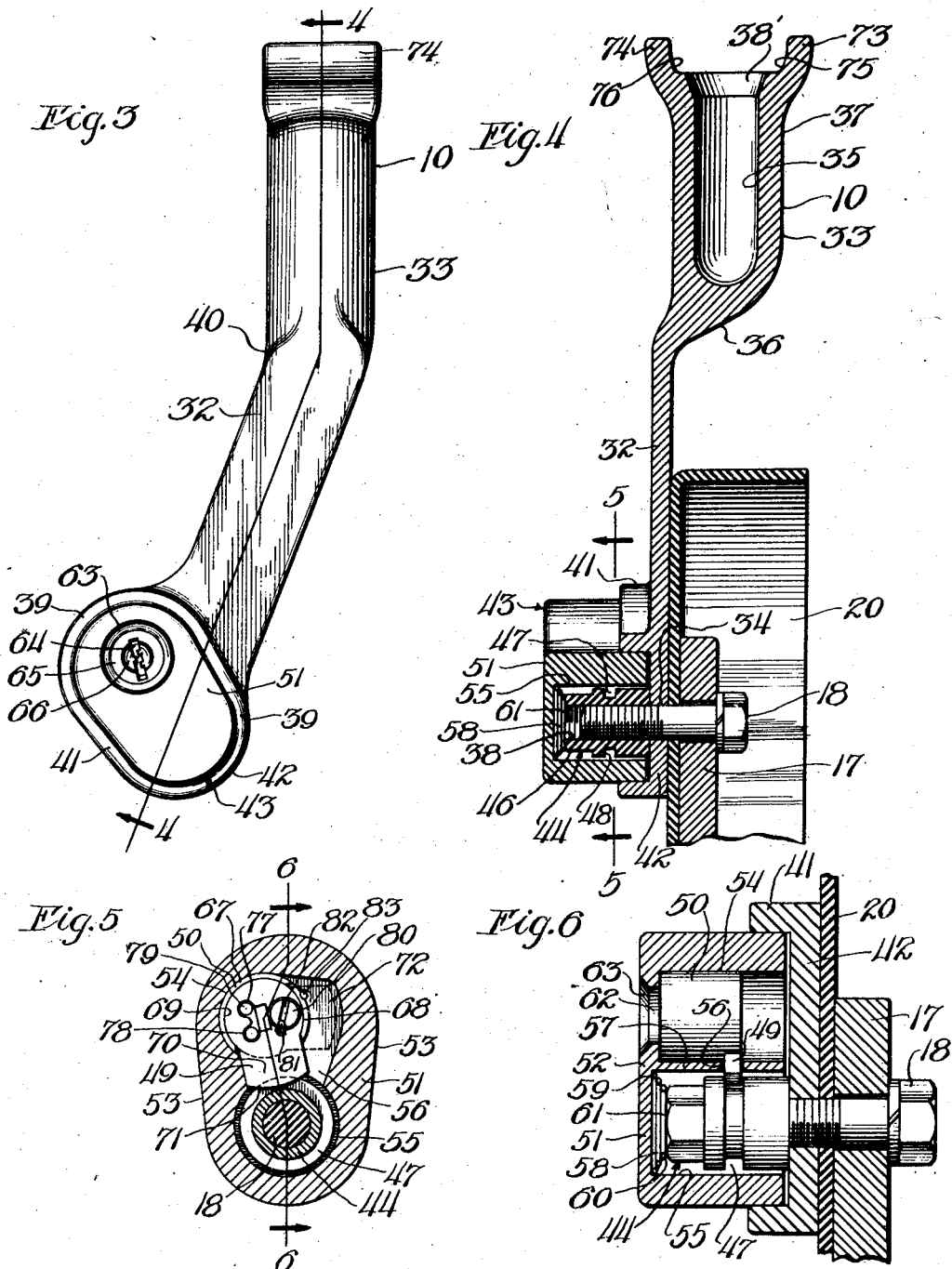

Patented Aug. 11, 1931

1,818,668

UNITED STATES PATENT OFFICE

FREDERICK E. BEACH AND EDGAR G. PETERSEN, OF CHICAGO, ILLINOIS, ASSIGNORS TO PINES WINTERFRONT COMPANY, OF CHICAGO, ILLINOIS, A CORPORATION OF DELAWARE

THEFT PREVENTING DEVICE

Application filed August 9, 1928. Serial No. 298,499.

The present invention relates to theft preventing devices, and is particularly concerned with locking devices for preventing theft of spare wheels and tires.

The invention is of particular importance with regard to wheels of the type having no demountable rims, so that the tire must be deflated before the removal of the casing, but the device may also be employed wherever it is desired to lock a wheel to a support and to prevent access to the valve carried by the tube.

One of the objects of the invention is the provision of an improved spare wheel lock, which is adapted to prevent removal of either the wheel or the tire casing and tube carried by the wheel.

Another object is the provision of a tire lock of the class described, which is adapted to prevent access to the tire valve, thereby eliminating any tampering with the valve, which might permit unauthorized persons to reduce the air pressure below the proper amount.

Another object is the provision of a tire lock adapted to prevent removal of the tire casing and tube from the wheel, except by puncturing or otherwise injuring the casing and tube.

Another object is the provision of a spare wheel locking device adapted both to lock the wheel to a carrier or other support and to prevent removal of the tire from the wheel.

Another object is the provision of a simple and effective spare wheel and tire lock, which comprises a novel assembly of a minimum of necessary parts, and which is economically manufactured and assembled.

Other objects and advantages of the invention will be apparent from the following description and from the accompanying drawings, in which similar characters of reference indicate similar parts throughout the several views.

In the drawings, of which there are two sheets;

Fig. 3 is an elevational view of the auxiliary device or arm for preventing access to the valve stem;

Fig. 4 is a sectional view taken on the line 4—4 of Fig. 3;

Fig. 5 is a sectional view taken on the line 5—5 of Fig. 4;

Fig. 6 is a sectional view taken on the line 6—6 of Fig. 5.

Figure 1:
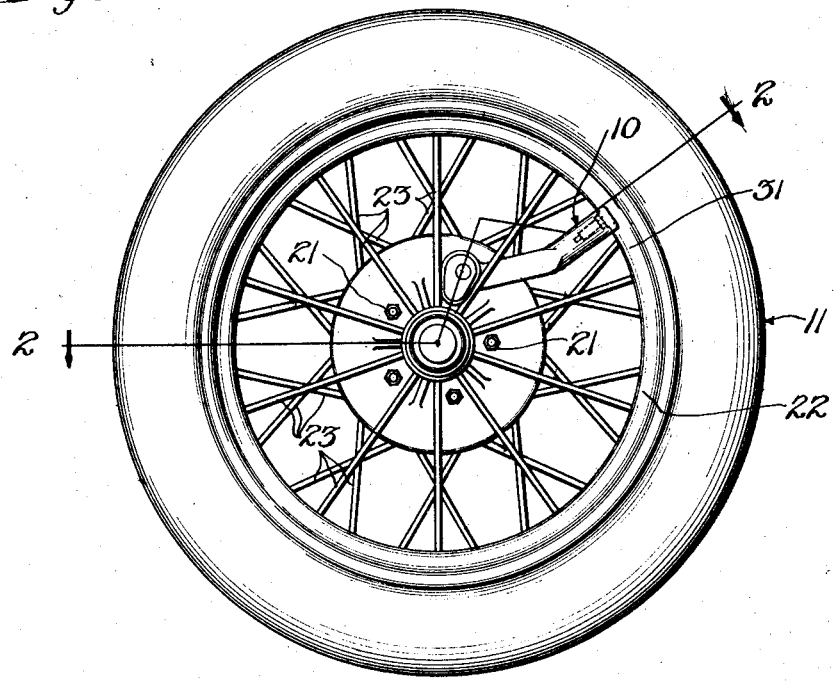
Fig. 1 is an elevational view of a wheel and tire equipped with our theft preventing device.
Figure 2:
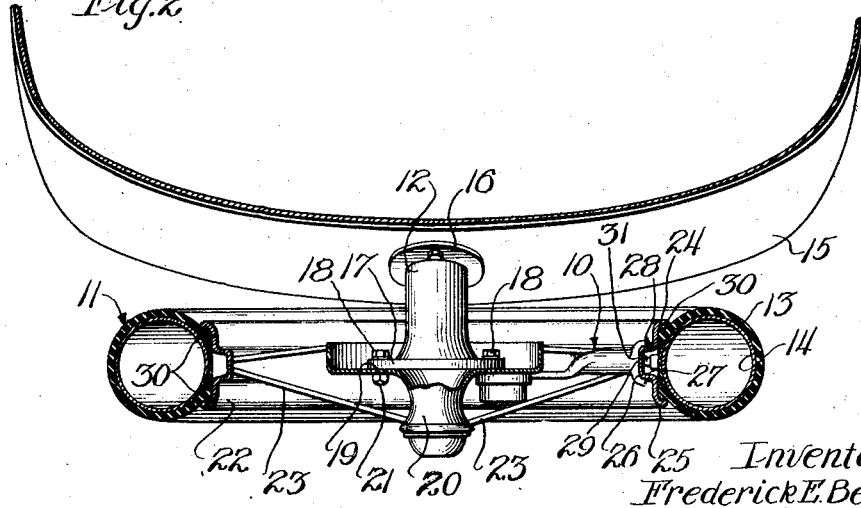
Fig. 2 is a sectional view taken on line 2—2 of Fig. 1, looking in the direction of the arrows.

Referring to Figs. 1 and 2, 10 indicates the theft preventing device in its entirety, the device being shown in connection with a spare wheel 11, a wheel supporting member 12, and a tire consisting of a casing 13 and tube 14.

Although the present device is illustrated with a conventional spare wheel carrier 12, we desire it to be understood that the use of the invention is not limited to spare wheels, and the device may also be applied, if desirable, to any axle or other support upon which a wheel may be carried. The invention is of particular importance when used in conjunction with spare wheels and pneumatic tires.

Referring to Fig. 2, 15 indicates a portion of a vehicle, which is provided with a spare wheel carrier 12, riveted or otherwise permanently secured thereto by means of the attaching flange 16. The spare wheel carrier 12 is provided with a substantially flat annular flange 17, simulating the attaching flange of a hub carried by the axle of the vehicle, and having a plurality of outwardly projecting studs 18 located to register with apertures 19 in the hub 20 of the wheel 11. The wheel is customarily applied to the carrier 12 by passing a plurality of the studs 18 through the apertures 19 and securing the wheel by a plurality of nuts 21, and according to the present invention the theft preventing device 10 is intended to replace one of the nuts 21.

The wheel 11 may consist of the hub 20, the rim 22 and means for connecting the hub and rim, comprising in the present illustration a plurality of spokes 23. Any form of spokes may be employed, and the present illustration merely shows one embodiment of a form in present use.

The rim 22 comprises a channelled annular metal member having outwardly extending annular flanges 24 and 25 for the purpose of retaining the casing 13 upon the rim, and in the present embodiment the rim 22 is also provided with a medially located inwardly extending channel 26, formed by the radially extending flanges 27 and 28 and the base flange 29. The channelled construction of the wheel 11 forms no part of the present invention, except in so far as the elements of this construction cooperate with the present device.

The retaining portions 30 of the casing 13 may be moved into the channel 26 for the purpose of facilitating removal of the casing, but in order to remove the casing or tube, it is ordinarily necessary to deflate the tube by means of a valve 31 since the casing is tensioned tightly about the rim 22 whenever the tube 14 is filled with air under pressure.

The present invention is not necessarily limited to rims having the channelled construction illustrated, but is of universal application to rims which prevent the removal of the tire without deflating the same. The rim 22 is provided with the usual aperture, permitting the valve stem 31 to project radially inward from the rim between the spokes 23.

The theft preventing device 10 includes an auxiliary member 32, which is carried by one of the studs 18, and has a laterally projecting arm 33 for preventing access to the valve stem 31. The auxiliary member 32 may consist of a cast metal arm having a transverse bore 34 at one end for receiving the stud 18, and a longitudinally extending bore 35 adapted to embrace the valve stem 31. In order to locate the bore 35 centrally of the rim 22, the arm 33 is provided with an offset at 36 and the outer end 37 is enlarged to provide a member of sufficient size to receive any commercial valve stem. The bore 35 may be provided with a frusto-conical outlet 38' for the purpose of guiding the valve stem 31 into the bore, and to provide room for the nut used to secure the valve stem in the rim 22.

The valve stem embracing member 37 is also preferably, but not necessarily, provided with a pair of longitudinally projecting lugs 73 and 74, forming shoulders 75 and 76 for engagement upon the opposite sides of the rim portions 27 and 28. The shoulders 75 and 76 are adapted to prevent lateral movement of the arm 33 out of the rim 22, but the same result may be accomplished if desired by the engagement of the valve stem 31 with the inside of the bore 35. The lugs 73 and 74 provide additional means for supporting the arms without the possibility of damaging the valve stem 31.

The arm 33 may be made substantially flat from the point 36 to a socket 39 carried by its inner end for the purpose of permitting the location of the auxiliary member between the spokes 23, where the space is limited. As the valve stem 31 projects radially from the rim 22 and the studs 18 are not located at the exact center of the wheel 11, the enlarged portion 37 of the arm 33 extends radially, and the arm is bent at 40 intermediate its ends to extend in a proper direction to engage about the stud 18. The inner end of the arm 33 is provided with a socket 39, which may be formed by an outwardly projecting wall 41, projecting at substantially right angles to the plane of the flat portion 42, and the socket 39 is preferably of substantially oblong form, tapering slightly toward one end 42 in order to insure the correct application of a locking device indicated in its entirety at 43.

The auxiliary arm 33 is adapted to be retained upon the stud 18 in the position shown in Figs. 1 and 2 by a threaded member or nut 44. The nut 44 comprises a metal member, preferably formed of hardened steel having an internally threaded bore 38, which is complementary to the stud 18, and the nut 44 is provided with a non-circular end 46 to facilitate the application of a wrench or other tool in threading the nut home upon the stud 18. The nut 44 is also provided with a circumferentially extending groove 47, forming an annular shoulder 48, which extends completely about the nut for engagement, in any position of the nut, with a plate 49 carried by a key-actuated device 50.

The theft preventing device is also provided with means for preventing access to the nut 44, comprising a casing 51 and a key-actuated device 50 for securing said casing in position, enclosing said nut. The casing 51 comprises a cast metal member having a flat outer face 52 of substantially the same shape as the oblong tapering socket 39. The lateral walls 53 of the casing 51 extend at substantially right angles to the flat outer face 52, and the casing 51 is adapted to be slidably received within the socket 39, preventing the insertion of prying tools or the like between the casing 51 and the auxiliary arm 33. The walls 41 which form the socket 39 are preferably of substantial height in order that they may slidably guide the casing 51, and so that the casing 51 cannot be removed from the socket 39 by the use of blows or force applied to the outer exposed portions of the casing. Any force applied laterally to the casing will only cause the casing to bind within the socket 39 and more firmly secure the casing in its socket without bringing any substantial breaking force into play upon the plate 49.

The casing 51 is provided with a pair of substantially parallel bores 54 and 55, the bores communicating by the slot 56 extending through the intervening wall or partition 57. The bore 55 is adapted to slidably receive the threaded member or nut 44, and this bore is preferably provided with means for preventing rattling, comprising a spring 58. The spring 58 preferably consists of a spiral helix of resilient wire having its outermost turns 59 in frictional engagement with the walls of the bore 55 to retain this spring within said bore. The turns 60 of lesser diameter are adapted to engage the relatively narrow annular surface 61, comprising the end of the nut 44, permitting the stud 18 to project through the nut, if necessary.

The bore 54 is provided with a small counterbore 62, which may communicate with a frusto-conical surface 63, leading to the outer face 52 of the casing. The counterbore 62 is of no larger size than is necessary to permit access to the key slot 64 by means of the key, and the locking device or tumbler barrel 50 is thus completely enclosed, except the key plate 65. The key plate 65 may have a slightly concave surface 66 adjacent the key hole 64 to facilitate the insertion of a key. The tumbler barrel 50 comprises a substantially cylindrical member of the conventional construction, diagrammatically illustrated in Fig. 6, having a cylindrical outer casing 67, which may be cut away as at 68 to an amount equal to the thickness of the locking plate 49. The tumbler barrel 50 rotatably supports the locking plate 49, having a substantially circular outer edge 69, and having a laterally projecting portion 70. The laterally projecting portion 70 may be provided with an outer edge 71, curved slightly to remove the outer corners and the projecting portion 70 is of sufficient length to extend from the tumbler barrel 50 through the slot 56, into the slot 47 behind the shoulder 48. The bore 54 is also provided with an enlargement 72, comprising a slot in the bore communicating with the slot 56 and of sufficient size to permit the locking plate 49 to swing to the dotted line position shown in Fig. 5. The locking plate 49 is preferably provided with a pair of apertures 77 and 78, adapted to receive projecting pins 79 carried by the tumbler barrel mechanism, and the plate may be secured in place by a screw bolt 80 passing through the locking plate 49 and threaded into a part carried by the tumbler barrel mechanism. The screw bolt 80 may be secured by driving a sharp center-punch or other pointed instrument into the plate adjacent the screw bolt 80, forming a depression 81 and causing the metal of the plate to interlock with the kerf 82. The tumbler barrel 50 may also be secured against rotation and removal by likewise driving a sharp center-punch into the juncture between the tumbler barrel casing 67 and the bore 54 as at 83, slightly deforming the wall of the bore and the tumbler barrel, and causing a slight spur to project into the tumbler barrel casing 67 from the bore 54.

The present locking device is applied and operated as follows:

The wheel may be placed upon a supporting stud 18 with the stud projecting through one of the apertures 19 of the wheel, and the auxiliary arm 33 may be placed with its bore 35 about the valve stem 31, the shoulders 76 and 75 engaging opposite sides of parts on the rim 22. As the arm 33 is provided with a relatively flat portion 42, this portion permits the insertion of the arm between the spokes 23 to embrace the valve stem 31, after which the socket 39 may be moved down between adjacent spokes 23 to be received upon a stud 18. If necessary, the arm 33 may be put in place before the wheel is placed upon stud 18. The arm 33 and wheel are then secured in place by threading nut 44 tightly upon stud 18, and the nut 44 may be enclosed by placing casing 51 over the nut in the socket 39. The locking plate 49 should then be in the dotted line position of Fig. 5, and as the casing 51 is slidably inserted in the socket 39, spring 58 will be compressed by engagement between the bottom of bore 55 and the end 61 of nut 44.

The tumbler barrel 50 is preferably of the type from which the key cannot be removed unless the locking plate 49 is in locked position; that is, the full line position of Fig. 5, thereby insuring the locking of the device since the key cannot be removed unless the device is locked. The operator may then turn the key counterclockwise in Fig. 3, rotating locking plate 49 clockwise in Fig. 5 from the dotted line position to the position shown in full lines, where plate 49 is engaged in slot 47. Plate 49 will then retain casing 51 upon the nut 44, the spring 58 maintaining plate 49 in firm engagement with shoulder 48, and preventing any rattling. The key may then be removed.

The device may be unlocked by inserting the key, turning the plate 49 to the dotted line position, removing lock casing 51 and nut 44, after which the arm 33 may also be removed.

It will thus be observed that we have invented a theft preventing device, which is adapted to prevent the removal of a wheel and to prevent access to a valve stem carried by a tire upon said wheel. The auxiliary arm provided for preventing access to the valve stem is adapted to be locked in place by a special nut, which may be substituted for one of the usual nuts employed in securing the wheel either to its axle or spare wheel support, and this nut is protected against unauthorized removal by enclosing the same in a key-actuated lock casing.

The lock casing itself is protected against removal by the outwardly projecting wall of a socket adapted to receive the base of the lock casing, and adapted to prevent the insertion of prying tools for removing the lock casing. If desired, the auxiliary arm may be extended to embrace more than one of the supporting studs 18, in which case it is only necessary to lock one stud and cover the other by means of said arm.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a tire lock, the combination of a support with a wheel and pneumatic tire carried by said support, an auxiliary member carried by said support and having an arm embracing the valve stem of said tire, and locking means for securing said arm upon said support, said arm having shoulders adjacent said valve stem for engaging oppositely disposed shoulders upon a wheel part.

2. In a theft preventing device, the combination of a stud, with a wheel and tire carried by said wheel, said stud passing through said wheel, an auxiliary member carried by said stud and having a radially extending arm embracing the valve stem of said tire, a nut for securing said auxiliary member to said stud, a casing for preventing access to said nut and key actuated means for locking said casing in position about said nut.

3. In a theft preventing device, the combination of a stud, with a wheel and tire carried by said wheel, said stud passing through said wheel, an auxiliary member carried by said stud and having a radially extending arm embracing the valve stem of said tire, a nut for securing said auxiliary member to said stud, a casing for preventing access to said nut and key actuated means for locking said casing in position about said nut, said arm having a socket for receiving said casing.

4. In a theft preventing device, a valve stem lock comprising a metal arm having a socket for receiving a valve stem, said arm having a laterally projecting flattened and offset portion for extending between the spokes of a wire wheel and for engaging a hub plate, said arm having an aperture for a carrier bolt and having a socket about said aperture for slidably receiving a locking device.

5. In a theft preventing device, a valve stem lock comprising a metal arm having a socket for receiving a valve stem, said arm having a laterally projecting flattened and offset portion for extending between the spokes of a wire wheel and for engaging a hub plate, said arm having an aperture for a carrier bolt and having a part rigidly secured to said arm with a socket about said aperture for slidably receiving a locking device, and a lock carried in said socket for locking said arm and said wheel to a carrier.

In witness whereof, we hereunto subscribe our names this 4th day of August, 1928.

FREDERICK E. BEACH.
EDGAR G. PETERSEN.